United States Patent [19]
Yoshino

[11] 3,984,972
[45] Oct. 12, 1976

[54] TRANSDUCER FOR QUARTZ CRYSTAL TIMEPIECE

[75] Inventor: Masahito Yoshino, Suwa, Japan

[73] Assignee: Kabushiki Kaisha Suwa Seikosha, Tokyo, Japan

[22] Filed: Apr. 4, 1975

[21] Appl. No.: 565,333

[30] Foreign Application Priority Data
Apr. 4, 1974  Japan.................................. 49-38371

[52] U.S. Cl............................. 58/23 D; 310/40 MM
[51] Int. Cl.²............................................. G04C 3/00
[58] Field of Search..................... 58/23 R, 23 D; 310/49 R, 49 A, 162, 163, 164, 90, 254, 156, 40 MM, 191, 192, 172

[56]  References Cited
UNITED STATES PATENTS

| | | | |
|---|---|---|---|
| 2,909,685 | 10/1959 | Szabo............................ | 310/163 X |
| 3,434,082 | 3/1969 | Montagu........................ | 310/156 X |
| 3,597,915 | 8/1971 | Aizawa.......................... | 58/23 D |
| 3,855,781 | 12/1974 | Chihara et al.................. | 58/23 D |

OTHER PUBLICATIONS
B. C. Kud, "Step Motors," pp. 157–159, 1974, West Publishing Co., New York.

*Primary Examiner*—Ulysses Weldon
*Attorney, Agent, or Firm*—Blum, Moscovitz, Friedman & Kaplan

[57] ABSTRACT

An improved quartz crystal timepiece transducer wherein torque of the rotor is maximized, and energy consumption is reduced is provided. The transducer includes a permanent magnet rotor having two opposite polarity poles, the rotor being formed with respect to the mechanical axis to define at least two concentric symmetrical equal radii surfaces. Two stator poles have a common coil wrapped therearound for receiving a timekeeping drive signal applied thereto. Both stator poles have symmetrical equal radii semicircular stator surfaces surrounding the rotor, the radii of the stator surfaces having a specific relationship therebetween, and each of the stator poles is eccentrically disposed with respect to the rotor mechanical axis and each other.

3 Claims, 7 Drawing Figures

TRANSDUCER FOR QUARTZ CRYSTAL TIMEPIECE

BACKGROUND OF THE INVENTION

This invention is directed to a transducer for a quartz crystal timepiece and in particular to a two pole step motor for use in a quartz cystal timepiece.

Heretofore, conventional step motors utilized in electronic timepieces have taken on various forms. One widely used step motor includes a pair of stators surrounding a rotor having six poles. Nevertheless, the effective torque of the rotor is determined by only two of the magnetic poles, thereby rendering the remaining pole unnecessary, and further resulting in a reduction in the efficiency of the step motor. Moreover, although the use of six rotor poles is designed to effect a rotation of the rotor through an angle of 60° in response to each pulse applied to the motor, quite often the rotor is rotated through an angle of 120° in response to a single pulse due to the inertia caused by the rotation thereof. Additionally, magnetization of the rotor in such manner as to provide six poles of equal magnetization force, is both expensive and difficult to effect.

In order to overcome these difficulties, step motors wherein a permanent magnet rotor is disposed directly inside a solenoid have been utilized. Nevertheless, in such motors, the cavity magnetic field generated by the solenoid is directly utilized to effect rotation of the rotor, and accordingly, it is difficult to concentrate the magnetic flux in such motor arrangements, thereby resulting in low efficiency. Accordingly, like the above noted arrangement, considerable current is required to generate sufficient power to effect a rotation of the rotor, a less than completely satisfactory feature in electronic timepieces wherein minimum current extends the life of the battery utilized to effect energization of such timepiece circuitry.

SUMMARY OF THE INVENTION

Generally speaking, in accordance with the invention an improved transducer for a quartz crystal timepiece is provided. The transducer is a step motor having a permenent magnet rotor including two opposite polarity poles, the rotor being formed with respect to said mechanical axis to define at least two concentric symmetrical circular equal radii arc surfaces. Two stator poles having a common coil wrapped therearound include symmetrical equal radii semi-circular stator surfaces surrounding the rotor, the radii of the symmetrical circular arc rotor surfaces and radii of the stator surfaces defining a specific ratio, and the stator surfaces being eccentrically disposed with respect to the rotor mechanical axis and each other.

Accordingly, it is an object of this invention to provide an improved transducer for use in a quartz crystal timepiece.

A further ojbect of this invention is to provide an improved step motor transducer for an electronic timepiece wherein a small amount of current is required to generate a sufficiently high power to effect rotation of the rotor.

Still a further object of this invention is to provide an improved step motor transducer for a quartz crystal timepiece wherein adjustment and assembly thereof is facilitated by the improved structure.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 7:
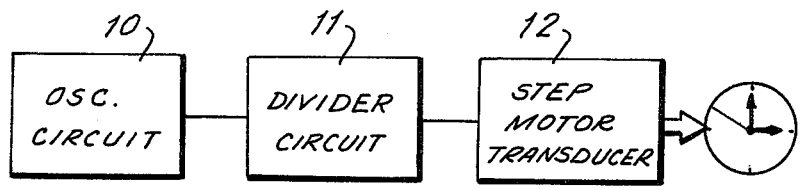
FIG. 7 is a block circuit diagram of a quartz crystal timepiece utilizing the improved step motor transducer depicted in FIG. 1.

Reference is now made to FIG. 7, wherein an improved quartz crystal timepiece utilizing the step motor transducer of the instant invention is depicted. An oscillator circuit 10 produces a high frequency time standard signal in accordance with a quartz crystal vibrator utilized as a time standard. The high frequency time standard signal is applied to a divider circuit 11 comprised of a plurality of series-connected divider stages adapted to produce a low frequency timekeeping signal having a period of 2 seconds and producing an opposite polarity drive pulse once each second to a transducer 12, which transducer in turn effects rotation of the display hands in the usual manner.

Figure 1:
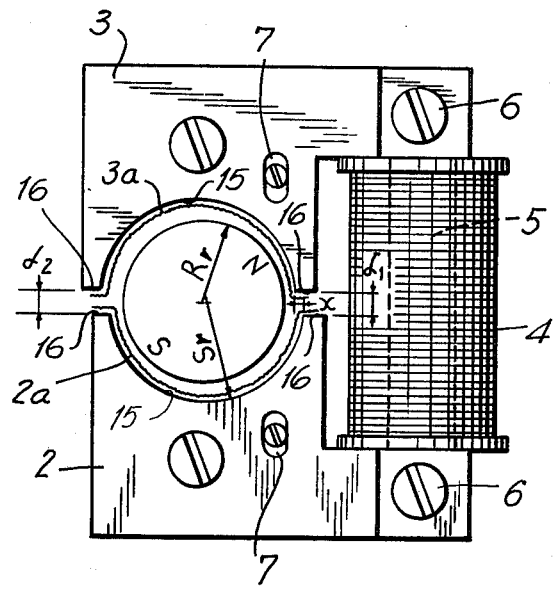
FIG. 1 is an elevational view of a two pole step motor transducer for an electronic timepiece constructed in accordance with the instant invention.
Figure 2:
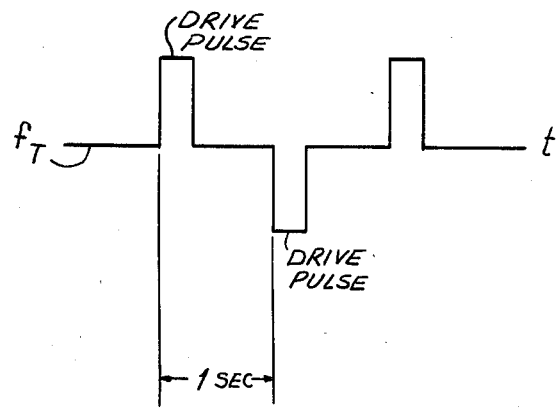
FIG. 2 is a wave diagram of a drive pulse applied to the step motor assembly to effect rotation thereof.

Reference is now made to FIG. 1 wherein a step motor transducer constructed in accordance with the instant invention is depicted. The step motor includes a cylindrical permanent magnet rotor having two diametrically opposite polarity poles. Stator poles 2 and 3 are affixed to a yoke 5, which yoke includes a coil 4 wound therearound. The coil is adapted to receive a drive pulse $f_T$ specifically depicted in FIG. 2. The stator poles 2 and 3 define symmetrical semi-circular equal radii surfaces 15 surrounding the rotor. Additionally, each stator pole includes end surfaces 16 in partially facing relationship with respect to each other. The respective stator poles are secured by pins 7 in such manner as to be eccentrically disposed with respect to the mechanical axis of the rotor and with respect to each other, the amount by which the respective surfaces 15 are eccentrically disposed with respect to each other being indicated as $x$. Additionally, adjustment pins 7 effect adjustment of the gap between the end surfaces of the stator poles facing each other, the gaps being respectively indicated as $\delta_1$ and $\delta_2$. As will be explained more fully below with respect to the graphical illustrations depicted in FIGS. 3 through 5, by providing a specific relationship between the radius of the rotor $Rr$ and the radii of the stator poles $Sr$, eccentrically positioning the stator poles with respect to the mechanical axis of the rotor, and providing a specific gap between the end surfaces of the stator poles, and improved highly efficient step motor transducer for use in a quartz crystal timepiece is provided.

By disposing the respective stator poles eccentrically with respect to each other and the mechanical axis of the rotor, the rotor is oriented into a specific orientation. Specifically the opposite magnetic rotor poles are positioned closest to the narrower portion of the gap formed by positioning stator surfaces 15 eccentrically with respect to the mechanical axis of the rotor. Upon application of a first polarity drive pulse to the drive coil 5, the polarities of the respective stator poles are reversed, thereby effecting a rotation of the rotor, whereafter a reverse polarity drive pulse is applied to the stator poles to effect another reversal of the polarity of the stators and hence once again affecting rotation of the rotor. Accordingly, the specific orientation causes the rotor to be continuously rotated in a single rotary direction in response to the application of opposite polarity drive pulses, once each second, to the drive coil 4.

Figure 3:
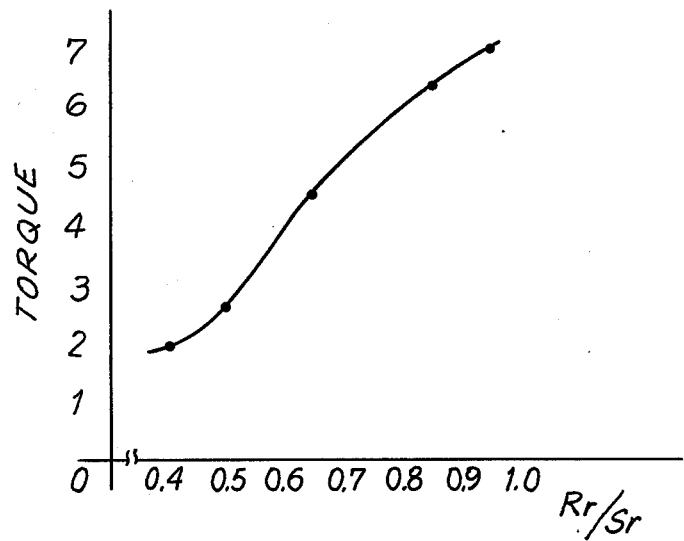
FIG. 3 is a graphical illustration comparing the ratio between the rotor and stator of the motor depicted in FIG. 1 to the torque generated thereby to effect rotation of a minute hand in an electronic timepiece.

Reference is now made to FIG. 3, wherein a graphical comparison of the relationship between the radius of the rotor and the radii of the surfaces 15 of the stator poles and the manner in which same affect the output torque of the minute hand of an electronic timepiece utilizing the step motor of FIG. 1 is depicted. Stator poles 2 and 3 depicted in FIG. 1 are adjusted to generate the maximum output torque possible. As is illustrated in FIG. 3, if the ratio of $Rr/Sr$ is 0.6 or greater, a sufficient output torque to affect rotation of the minute hand is easily produced. Nevertheless, experimental values depicted in FIG. 3 illustrate that the failure of the ratio of the radius of the rotor and radii of the stator surfaces to exceed a minimum value results in insufficient magnetic flux being generated effecting rotation of the rotor.

Figure 4:
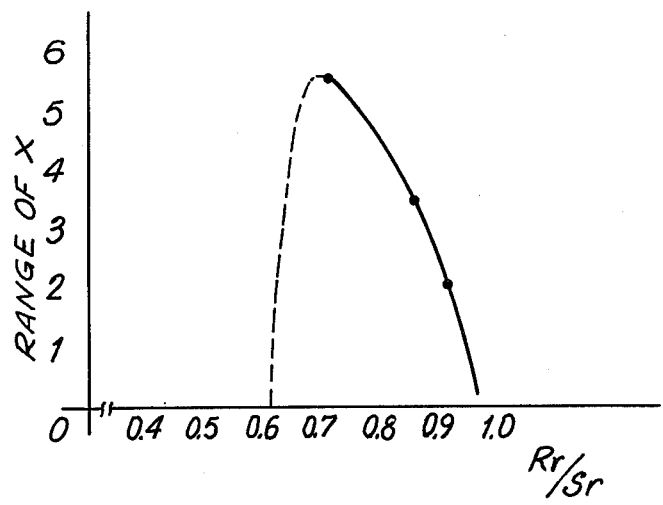
FIG. 4 is a graphical illustration of the relationship between the ratios of the rotor and stator pole radii and the eccentricity of the stator poles with respect to the mechanical axis of the rotor when the output torque of the minute hand is 4 g-cm.

Reference is made to FIG. 4, wherein still a further graphical illustration demonstrates the manner in which the range of the ratio between the rotor radius $Rr$ and the stator pole radii $Sr$ is determined. FIG. 4 demonstrates the manner in which the eccentricity of the stator poles and the ratio between the radii of the rotor and stator yokes must be varied in order to provide a constant output torque to the display hands.

As detailed in FIG. 4, if the radii ratio of the rotor and stator is 0.9 or less, the eccentricity of the stator poles with respect to each other is easily adjusted to obtain an output torque of 4 g-cm or greater. Nevertheless, when the ratio of the rotor and stator radii exceeds 0.9 and approaches 1, the output torque is significantly affected by the close tolerances required to effect proper alignment of the stators and accordingly adjustment of the stators becomes difficult. Although conventional step motors have utilized a ratio of rotor to stator radii in the range of 0.92 to 0.97, such step motor arrangements not only are difficult to properly adjust, but produce less than completely satisfactory output torque.

From the foregoing discussion directed to the graphical illustrations depicted in FIGS. 3 and 4, it is apparent that the instant invention is directed to a step motor having a ratio of rotor radii to stator radii ($Rr/Sr$) on the order of 0.6 to 0.9.

Figure 5:
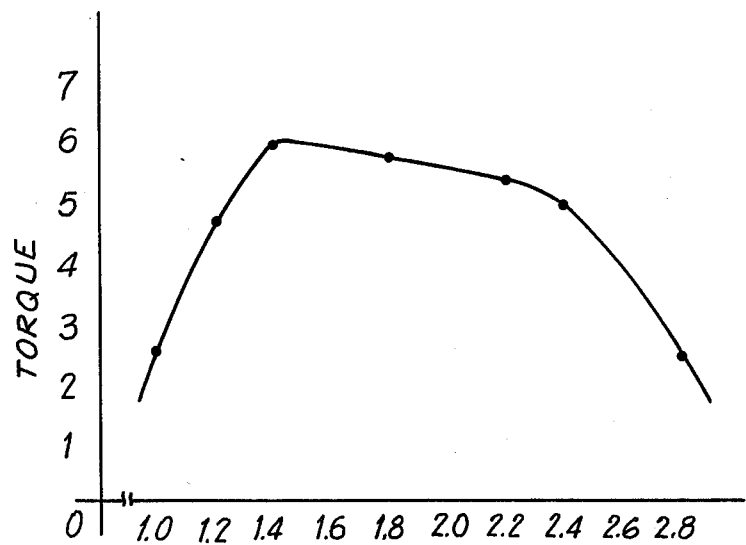
FIG. 5 is a graphical illustration comparing the ratio defined by the sum of the gaps between the stator poles to the difference between the rotor and stator radii, and the torque produced by varying the relationship therebetween.

Reference is now made to FIG. 5 wherein still a further graphical illustration of a relationship defined as the ratio of the sum of the gaps $\delta_1$ and $\delta_2$ between the end surfaces of the stator poles facing each other, and the difference between the stator radii $Sr$ and rotor radii $Rr$ and the effect same has on the output torque of the minute hand when same is rotated in response to each rotation of the rotor is depicted. The output torque is at a maximum when the ratio $(\delta_1 + \delta_2)/(Sr - Rr)$ is 1.2 to 2.4. Stated otherwise, if $(\delta_1 + \delta_2)/(Sr - Rr)$ is too small the magnetic flux generated at the coil portion is insufficient to bridge the gaps $\delta_1$ and $\delta_2$ shown in FIG. 1. On the other hand, if $(\delta_1 + \delta_2)/(Sr - Rr)$ is too large, the efficiency of the entire magnetic circuit is decreased, hence requiring an increased consumption of current.

In a small sized quartz crystal timepiece, the radii of the stator poles is not greater than 1.5 mm in view of the limited space provided therefor. Accordingly, if $(Sr - Rr)$ is 0.1 mm or less, the small difference in the respective radii can cause dust or fluff to collect between the stator poles and rotor and affect the step motor's performance. Moreover, when the gap between the rotor and stators is so small, the finish of the elements such as burrs or the like on the edge surfaces, depicted as $2a$ and $3a$, render the forming of such a step motor with such close tolerances extremely difficult. It is noted that the instant invention is particularly effective when magnetic flux of the rotor is on the order of 600 G or more.

Figure 6:
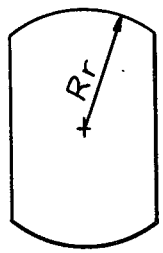
FIG. 6 is an elevational view of a different rotor configuration adapted for use in accordance with the instant invention.

Reference is now made to FIG. 6 wherein an alternate rotor construction adapted for use in the step motor depicted in FIG. 1 is depicted. The rotor includes two equal radii circular arced surfaces, with two further reduced radii flat surfaces. As long as the concentric symmetrical circular arc surfaces have a radius forming a ratio with the radii of the stator poles surrounding same in accordance with the ranges detailed above, an improved step motor wherein increased power and reduced current consumption will be provided.

It is noted, that the instant invention provides an efficient step motor transducer for use in quartz crystal electronic timepieces and that such a step motor transducer requires little or no adjustment if the radius of the stator poles is 1.5 milimeters or less. Moreover, if the second hand of the electronic timepiece is advanced every 1 second, it is possible to limit power consumption of the step motor to no greater than 4 $\mu$W, and to effect a driving of the timepiece for 2 years or more by a single button battery. For the examples detailed above, the output torque of the motor measured at the minute hand was taken at 4 g-cm or greater, which value is more than five times larger than the torque necessary for effecting rotation of the entire gear train of a quartz crystal vibrator wristwatch, thereby demonstrating the utility of the instant invention.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A step motor transducer particularly suited for use in an electronic timepiece comprising in combination a permanent magnet rotor having two opposite polarity poles, said rotor being formed with respect to said mechanical axis to define at least two concentric circular equal radii surfaces having a radius $Rr$, and stator means including two stator poles having a common coil wrapped therearound, said stator poles having two symmetrical equal radii semi-circular stator surfaces having a radius $Sr$ surrounding said rotor, each said stator pole including end surfaces, said respective stator pole end surfaces being disposed in facing relationship with respect to each other to define gaps $\delta_1$ and $\delta_2$ therebetween, said rotor radii, stator radii and gaps between said stator pole end surfaces having the following relationship:

$$1.2 \leq (\delta_1+\delta_2)/(Sr - Rr) \leq 2.4$$

2. A step motor transducer as claimed in claim 1, wherein the ratio of said rotor radii $Rr$ to said stator radii $Sr$ is in the range of 0.6 to 0.9.

3. An electronic timepiece comprising an oscillator circuit adapted to produce a high frequency time standard signal, divider means adapted to produce a low frequency drive signal in response to said high frequency time standard signal applied thereto, and a step motor transducer including a permanent magnet rotor having two opposite polarity poles, said rotor having a circular cross-section and being uniformly cross-section with respect to said mechanical axis to define a first radius, and stator means including two stator poles having a common coil wrapped therearound, said common coil being adapted to receive said timekeeping signal produced by said divider means, each said stator pole having an equal radii semi-circular stator surface surrounding said rotor, the ratio of said rotor radius to said stator radii being within the range of 0.6 to 0.9 and display hands coupled to said step motor transducer, said hands being rotated in response to each rotation of said rotor wherein both said stator poles include two end surfaces, said respective stator pole end surfaces being positioned in facing relationship with respect to each other to define a gap therebetween, the ratio of the sum of the gaps between the end surfaces to the difference between the stator radii and rotor radius being within the range of 1.2 to 2.4.

* * * * *